United States Patent [19]
Whipple, Jr.

[11] 3,755,142
[45] Aug. 28, 1973

[54] PROCESS AND APPARATUS FOR THE PURIFICATION OF A NATURAL BODY OF WATER

[76] Inventor: William Whipple, Jr., 395 Mercer Rd., Princeton, N.J. 08540

[22] Filed: May 21, 1971

[21] Appl. No.: 145,766

[52] U.S. Cl. .................. 210/63, 210/219, 210/220, 210/242, 261/92, 261/93, 261/124, 261/125
[51] Int. Cl. .............................................. C02c 5/04
[58] Field of Search ..................... 210/63, 242, 220, 210/219, 15, 60; 261/86, 87, 92, 93, 124, 125

[56] References Cited
UNITED STATES PATENTS

| | | | |
|---|---|---|---|
| 3,671,022 | 6/1972 | Laird et al. | 261/93 X |
| 3,123,652 | 3/1964 | Gross | 261/87 X |
| 302,326 | 7/1884 | d'Heureuse | 261/120 |
| 3,505,213 | 4/1970 | Anthony et al. | 210/63 X |

*Primary Examiner*—Michael Rogers
*Attorney*—Watson, Cole, Grindle & Watson

[57] ABSTRACT

Process and apparatus for purification of pollutants in a natural body of water includes the introduction of pure oxygen into the water and thereafter agitating the water supersaturated with oxygen so as to effectively disperse the treated water and cause it to be mixed with the untreated water. The oxygen may be introduced directly into the body of water to be treated or into a tank whereafter the treated water is discharged into the water and subsequently agitated.

32 Claims, 39 Drawing Figures

PATENTED AUG 28 1973     3,755,142

INVENTOR,
WILLIAM WHIPPLE, JR.
BY Watson, Cole, Grindle & Watson
ATTORNEYS

INVENTOR,
WILLIAM WHIPPLE, JR.
BY Watson, Cole, Grindle & Watson
ATTORNEYS

INVENTOR,
WILLIAM WHIPPLE, JR.
BY Watson, Cole, Grindle & Watson
ATTORNEYS

PROCESS AND APPARATUS FOR THE PURIFICATION OF A NATURAL BODY OF WATER

This invention relates generally to a process and apparatus for treating a natural body of water and more particularly to a process and apparatus for introducing oxygen into the natural body of water and thereafter dispersing the oxygen-supersaturated water throughout the natural water body, thereby to effectively oxygenate the pollutants therein.

In order to enhance the quality of the water in our streams, rivers and lakes, the introduction of pure oxygen thereinto as a means of purification has been used to effect the oxidation of the pollutants therein. The introduction of oxygen into water by means of aerators, which make use either of compressed air bubbled through the water or which agitate and stir the water so as to absorb the oxygen from the air, have been heretofore used not only in the activated sludge processes of sewage treatment but also in rivers and streams and other natural bodies of water. Also, pure oxygen has been introduced into natural bodies of water for the purpose of enhancing the water quality by means of diffusers located at a predetermined depth in the water or by means of adding oxygen under pressure to the water in a tank after which the supersaturated water is returned to the river.

Although these artificial oxygenation techniques have met with some limited success, it has been found that the treated water which is to some extent supersaturated with oxygen may be harmful to the fish or valuable types of aquatic life. Also, the treated water may also lose part of its added oxygen if not rapidly dispersed. It has been therefore thought that oxygenation could be accomplished satisfactorily by diffusion of air. However, the use of pure oxygen has been found to reduce the cost of the operation since the liquid oxygen may be easily volatilized at high pressures so that oxygenation can be accomplished without need for any expensive and bulky power equipment.

The use of pure oxygen in this environment is, however, not without its disadvantages. For example, pure oxygen has a tendency to supersaturate the water since the absorption of pure oxygen by the water is approximately 5 times as rapid as that of oxygen from air. Since the normal oxygenation processes which make use of diffusers and aerators create very little turbulence in the water, the supersaturated water has a tendency to move miles downstream without much dispersion throughout the remaining body of river. Also, these diffusers cannot in many cases be installed in navigable channels due to possible interference with navigation and/or with maintenance dredging requirements. Moreover, where currents are slow, particularly in tidal estuaries, such diffusers would require being placed rather closely together along the water's edge in order to facilitate adequate dispersion. It can be therefore seen that a large number of diffuser sites may be required in order to assure adequate dispersion of oxygen throughout a problem area (which may be 40 miles long and over a half-mile wide on the average) without creating pockets of supersaturated or deficient oxygen at certain times. Either of these effects would be harmful to fish for the reason that fish cannot distinguish water with either deficient oxygen or a supersaturated amount of oxygen when they enter it but remain until they begin to suffocate, then react randomly. It would thus be quite advantageous if the process of oxygenating the water were to be accompanied by a sufficient vibration in the water to repel fish from the immediate vicinity thereof. Most importantly, it would be advantageous if the oxygenated water were dispersed adequately throughout the river cross-section so that substantially the entire body of water could be effectively treated. Moreover, it would be helpful if the oxygenation process could take place in the middle of the water body.

It is therefore the principal objective of the present invention to avoid these stated drawbacks during the process of artificially oxygenating a natural body of water by providing a process and apparatus wherein the oxygenated water, after introduction of the oxygen thereinto, is agitated so as to effectively disperse the treated water and cause it to be mixed with the surrounding untreated water. Such agitation is effected by means of the propeller of a moving boat disposed in such a relation with the oxygen diffuser, or other oxygen-introducing means, as to disperse the highly oxygenated water through a turbulent water action caused by the moving propeller. Accordingly, one such oxygen boat may be conveniently used in place of a large number of oxygen diffuser sites which are each normally provided with an oxygen supply, supplyl lines, diffusers and other oxygenating equipment. It can be therefore seen that such oxygen boats would not be restricted to operating in waters outside of channels and anchorage areas, but could pass without obstruction through navigable waters as required for a complete and efficient dispersion of oxygen.

Another object of the present invention is to provide a process of purifying the pollutants in a natural body of water wherein oxygen is dissolved into the water in such quantity as to permit the water to become supersaturated with the oxygen whereafter it is agitated so as to cause it to be dispersed throughout and mixed with the surrounding untreated water to thereby oxidate the pollutants therein.

Another object of the invention is to provide such a process wherein the oxygen is dissolved into the water at a predetermined distance below the surface thereof and the supersaturated water is agitated by means of a propeller rotatable on an axis inclined slightly downwardly from the horizontal.

A further object of the invention is to provide such a process wherein the oxygen is dispersed into the water by means of a diffuser or a disperser in the vicinity of the rotatable propeller.

A still further object of the invention is to provide such a process wherein any excess amount of oxygen which may not have been dissolved in the water is collected and directed back into the diffuser.

A still further object is to provide such a process wherein a quantity of the water to be purified is introduced into a tank installed on a movable craft after which oxygen is dissolved therein to a supersaturation point whereafter it is discharged into the natural body of water and thereafter agitated so as to be dispersed throughout and mixed with the surrounding water.

A still further object is to provide such a process wherein such a tank may have a plurality of intercommunicating compartments, each with a diffuser or other like means located therein so that the water introduced thereinto is supersaturated with oxygen in each compartment as it flows successively therethrough, excess amounts of oxygen being collected in the tank and directed to one of the diffusers.

A still further object is to provide such a process wherein the water in the tank may be oxygenated during its flow therethrough.

A still further object of the present invention is to provide an apparatus for purifying the pollutants in a natural body of water by volatilizing liquid oxygen to its gaseous state with the use of an atmospheric heat exchanger on board a waterborne vessel propelled by means of a screw propeller located at a predetermined distance below the hull of the vessel, a means for introducing the gaseous oxygen directly into the water to be purified being located in the vicinity of the propeller so that oxygen may be directed into the wake of the vessel or forward of the propeller whereby the highly oxygenated water will be effectively dispersed throughout a large volume of the surrounding untreated water.

A still further object is to provide such an apparatus wherein the means for introducing the oxygen into the water includes a pipe-like or plate-like diffuser, an autodisperser having a movable cap section with grooves for dispersing the oxygen, or a blade member into which oxygen in introduced so as to be dispersed by the turbulent flow therearound.

A still further object is to provide an apparatus for the purification of pollutants in a natural body of water wherein the oxygen supply, heat exchanger and other related equipment are mounted on a floating barge propelled by means of a boat, a diffuser means being located in the vicinity of the boat propeller and the water oxygenated thereby being dispersed and directed downwardly from the surface of the body of water by means of a propeller and a downwardly inclined forward section of the barge.

A still further object is to provide such an apparatus wherein the diffuser means is pivotally mounted on the barge so as to be conveniently movable out of the water in a direction away from the barge's forward end. the other, A still further object of the present invention is to provide an apparatus for purifying the pollutants in a natural body of water wherein a supply of oxygen, pump means and other related equipment are provided on a movable boat, a disperser for the oxygen in the form of a hollow tube or tubes being provided for directing liquid oxygen directly in the vicinity of the propeller so as to be dispersed thereby as it vaporizes during its release under high pressure and velocity.

A still further object of the invention is to provide an apparatus for purifying the pollutants in a natural body of water wherein a supply of liquid oxygen on board a waterborne vessel is volatilized by means of a heat exchanger and is directed to the bottom of a multi-compartmented tank through which the water to be purified is made to flow upwardly from one adjacent tank and downwardly through theother, in each case being oxygenated by means of a diffuser in each compartment and pump means being provided for removing any excess oxygen which has not been dissolved in the water and pumping in back to the diffusers so as to more fully oxygenate the water before it is discharged from the tank.

A still further object is to provide an apparatus for purifying the pollutants in a natural body of water wherein liquid oxygen is volatilized and directed through one set of a plurality of diffuser pipes in a tank into which the water to be treated is directed, and pump means being associated with the tank so as to remove any excess oxygen which has not been dissolved and pumped to another set of diffuser pipes in the tank.

A still further object is to provide an apparatus for purifying the pollutants in a natural body of water wherein liquid oxygen is volatilized and directed through a multi-compartmented tank having a diffuser in one compartment and which is also provided with mechanical aerators for aerating the water in each compartment as it flows from inlet to outlet.

Other objects, advantages and novel features of the invention will become apparent from the following detailed description of the invention when considered in conjunction with the accompanying drawings wherein:

FIG. 1b is a top view of the oxygen boat shown in FIG. 1a;

FIG. 1c is a sectional view taken along the line 1c—1c of FIG. 1a showing the diffuser pipes and the disposition of the boat's twin propellers;

FIG. 1d is a schematic view which demonstrates the functioning of a propeller relative to a diffuser in accordance with the FIG. 1a embodiment.

FIG. 2a is a schematic view of a towboat and a connected floating barge provided with the water-oxygenating equipment in accordance with another aspect of the present invention;

FIG. 2b is a top view of the embodiment shown in FIG. 2a;

FIG. 4b is a top view of the embodiment shown in FIG. 4a;

FIG. 5a is an elevational side view showing the details of the FIG. 4a diffuser pivotally secured to the forward end of the floating barge;

FIG. 5b is a top view of the diffuser means shown in FIG. 5a;

FIG. 6a is an elevational side view showing the details of another type diffuser means pivotally mounted at the forward end of the floating barge shown in FIG. 4a;

FIG. 6b is a sectional view taken substantially along the line 6b—6b of FIG. 6a;

FIG. 7b is a top view of the embodiment shown in FIG. 7a;

FIG. 7c is a sectional view taken along the line 7c—7c of FIG. 7a;

FIG. 7d is a partial sectional view of the tip of the nozzle shown in FIG. 7a;

FIG. 9b is a sectional view of the floating barge taken along the line 9b—9b of FIG. 9a;

FIG. 9c is a transverse sectional view of the floating barge taken along the line 9c—9c of FIG. 9a;

FIG. 10b is a top view of the embodiment shown in FIG. 10a;

FIG. 13b is a sectional view taken along the line 14b-14b of FIG. 13a;

FIG. 14b is a top view of the device shown in FIG. 14a;

FIG. 15b is a sectional view of the aspirator taken along the line 15-15b of FIG. 15a;

FIG. 16b is a sectional view of the aspirator taken along the line 16b—16b of FIG. 16a.

Figure 1A:
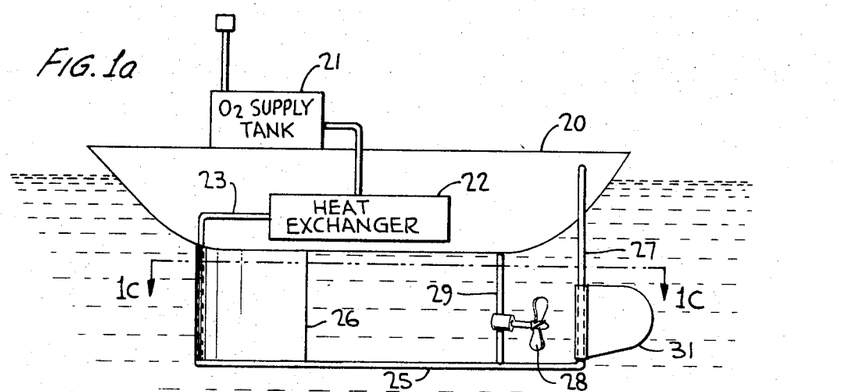
FIG. 1a is a schematic view of an oxygen boat with the water-oxygenating apparatus thereon in accordance with one aspect of the present invention.
Figures 1B, 1C, 1D, 2A:
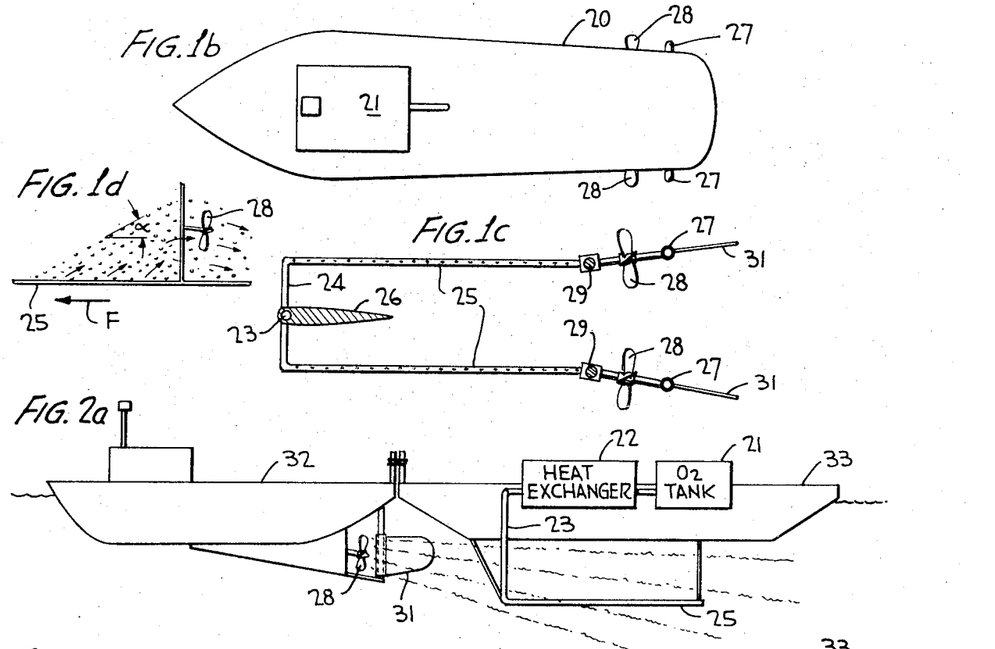

Turning now to the drawings wherein like reference characters refer to like and corresponding parts throughout several views, there is shown in FIGS. 1a and 1b respective side and top schematic views of an oxygen boat 20, of any conventional design, showing only those elements necessary in carrying out the invention. A container or supply tank 21 is provided on the vessel as well as a heat exchanger 22 which volatilizes the liquid oxygen and passes it through a conduit 23 for directing the gaseous oxygen through a header pipe 24 interconnected with hollow diffuser pipes 25 for introducing the oxygen into the water. It should be noted that these diffuser pipes are mounted well below the waterline at a distance from the bottom of the boat's hull by means of a support member 26 to which the conduit 23 and header 24 is secured at the forward end further by means of supports 27 at the aft end on either side of the boat, as shown by FIG. 1b.

A conventional screw-type propeller 28 is operably mounted on a drive shaft 29, in association with each diffuser member, as shown in FIG. 1c, and is operable by a motor means and other propelling equipment, not shown for the sake of clarity. In FIG. 1a it should be noted that the propellers (only one shown) are each mounted for rotation about an axis which is inclined slightly downwardly from the horizontal and, in FIG. 1c, the propellers are also shown mounted for rotation about respective axes which diverge from the aft sides of the boat. In this way, the gaseous oxygen introduced into the water through each perforated diffuser pipe 25 is conveniently dispersed throughout a relatively deep and wide portion of the natural body of water by means of the turbulent water flow created by the propellers which disperse the oxygen emitted in its wake both at a low depth because of the downward inclination of the props and in a wide area because of the divergent arrangement of the prop axes. It can be therefore seen that, as the boat 20 moves forward, bubbles of gaseous oxygen are introduced forward of the propellers 28 which then disperse them throughout the wake zone so as to be dissolved in the water. The increased depth of the dispersed oxygen by reason of the downwardly inclined propellers serves to increase the absorption of the oxygen into the water and also to limit the condition of supersaturation. As the water in the vicinity of the wake moves away from the boat, it is mixed with the surrounding portion of water by the propeller turbulence and will soon be dissolved with oxygen at a level below the supersaturation level existent in the area forward of the propellers 28. Also, the underwater vibration of the propeller normally repels fish and should keep them away from the wake until the supersaturation level is reduced through mixture with the surrounding water. If necessary, however, some auxiliary underwater noisemaker could be utilized.

In FIG. 1d the functioning of the propellers relative to the diffusers is fully characterized in some detail. For example, the boat 20 moves forward in the direction of arrow F with a velocity $V_1$ and the gaseous oxygen bubbles from the diffusers 25 rise from their entire length with a velocity $V_2$ relative to the water. The angle $\alpha$ shown therein is that angle whose tangent is $V_2/V_1$ and it must be such that the gaseous oxygen bubbles rising forward of the propellers are all swept into them by suction currents as shown by the several arrows. Accordingly, the oxygen bubbles will enter into the zone of a very turbulent flow and will be directed slightly downward by reason of the downward inclination of the propellers so as to delay the rising of bubbles to the surface of the water, thereby showing that the oxygen will be substantially absorbed by the water. The velocity $V_2$ is controllable by the size of the diffuser apertures, by the pressure of oxygen in the diffusers, and to a lesser extent by other factors. The length of each diffuser and its hole size will, of course, be selected in accordance with the size of each propeller and the intended speed of the oxygen boat.

Figure 2B:
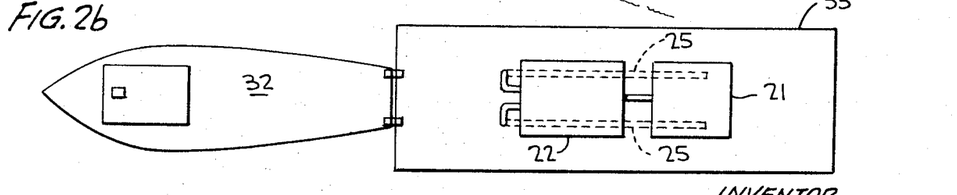

Another embodiment of the present invention is shown in FIGS. 2a and 2b wherein a vessel 32 is arranged to tow a floating barge 33, both shown schematically, and both of which are conventional in their design. Here, the oxygen supply tank 21 and the heat exchanger 22, as well as the diffusers 25, are arranged on the barge 33 itself so that it will not be necessary to equip the towboat in any way with the necessary oxygenation apparatus. The propellers 28 (only one of which is shown in FIGS. 2a) are provided on the vessel 32 slightly deeper and at a downwardly inclined and outwardly diverging angle more than normally would be the case for inland navigation. Rudders 31 are also provided in a manner similar to that of FIG. 1a and the inclination and divergence of the propellers is also similar to that shown in FIGS. 1a and 1c. In this embodiment, the oxygen which has been volatilized by the heat exchanger is directed through conduit 23 and into the diffuser pipe members 25 so that gaseous oxygen may be emitted in the wake of the propellers and the highly oxygenated water in the vicinity of the diffusers may be conveniently agitated by the turbulent flow caused by the propellers and dispersed throughout the surrounding water thereby to oxygenate a large volume of water than normal as the barge is being towed. It should be also noted that the barge 33 may be located ahead of the towboat 32 and the oxygen directed astern by tubes to diffusers located under the oxygen boat.

Figure 3:
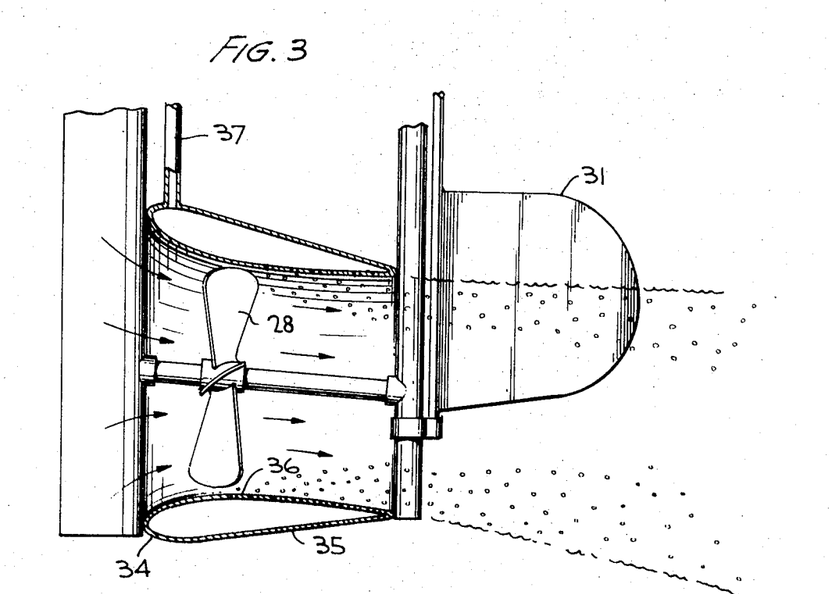
FIG. 3 is a view showing in cross-section an annular diffuser means mounted with respect to the propeller of the oxygen boat.

As an alternative to the elongated diffuser pipes shown in FIGS. 1a and 2a, the means for introducing gaseous oxygen into the natural body of water may be designed in the form of a double-walled annular ring 34 mounted in a manner to completely enshroud each propeller 28, as shown in FIG. 3 of the drawings, in the interest of increasing propeller efficiency. The annular diffuser ring 34 is fed with the gaseous oxygen between its spaced double walls 35, 36 by means of a tubular conduit 37 similar to conduit 23 in the aforedescribed embodiment. The inner wall 36 of the annular ring is provided with a plurality of apertures in the region aft of propeller 28 so as to introduce oxygen into the water within the space surrounding the propeller and into the stream of turbulent water passing thereby. Such an arrangement is not only quite compact but it assures that the oxygen bubbles are thoroughly and uniformly mixed in the zone of turbulence. Also, the inner wall 36 may be provided with apertures forward of the propeller so as to emit oxygen bubbles forward as well as aft thereof, if desired.

Figure 4A:
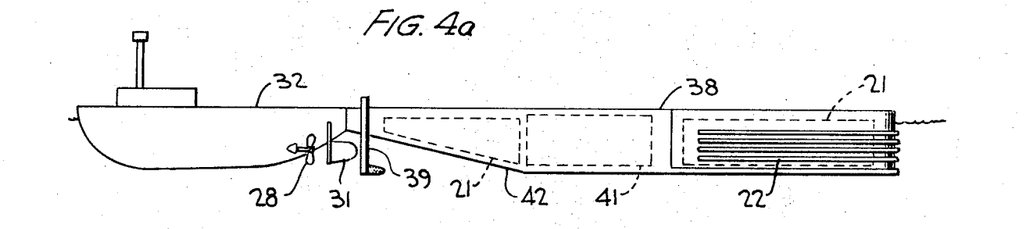
FIG. 4a is a schematic view of a towboat and a connected floating barge in accordance with another aspect of the present invention.
Figure 4B:
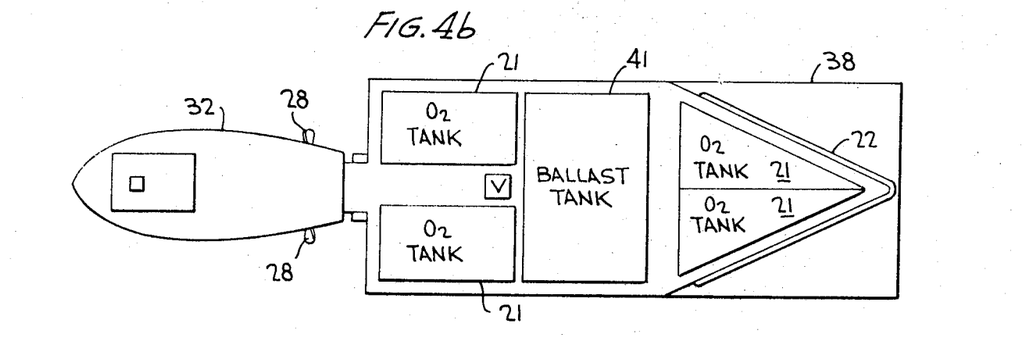

In FIGS. 4a and 4b of the drawings, the conventional towboat 32 is shown schematically in a manner similar to that shown in FIGS. 2a and 2b except that a slightly different floating barge 38 is towed behind the boat. The floating barge 38 is provided with tanks 21 for supplying liquid oxygen with, as before, accompanying valves and controls not shown for the sake of clarity. The heat exchanger 22 is arranged to be exposed directly to the water surrounding the barge so as to be thereby conveniently cooled. A diffuser means 39 is shown mounted near the forward end of barge 38 and is conveniently supplied with gaseous oxygen in a manner similar to the aforedescribed embodiment so as to introduce gaseous oxygen into the turbulent flow of the propellers 28. The barge may also contain one or more ballast tanks 41 which may be filled by means of a pump (not shown) through a valve V in order to maintain the level of the barge at a desired depth relative to the propellers 28 of the vessel 32. Also, the forward portion of the barge bottom is sloped upwardly as at 42 toward the towboat so as to downwardly divert the turbulent wake of the propellers with its oxygen bubbles.

Figures 5A, 5B, 6A, 6B:
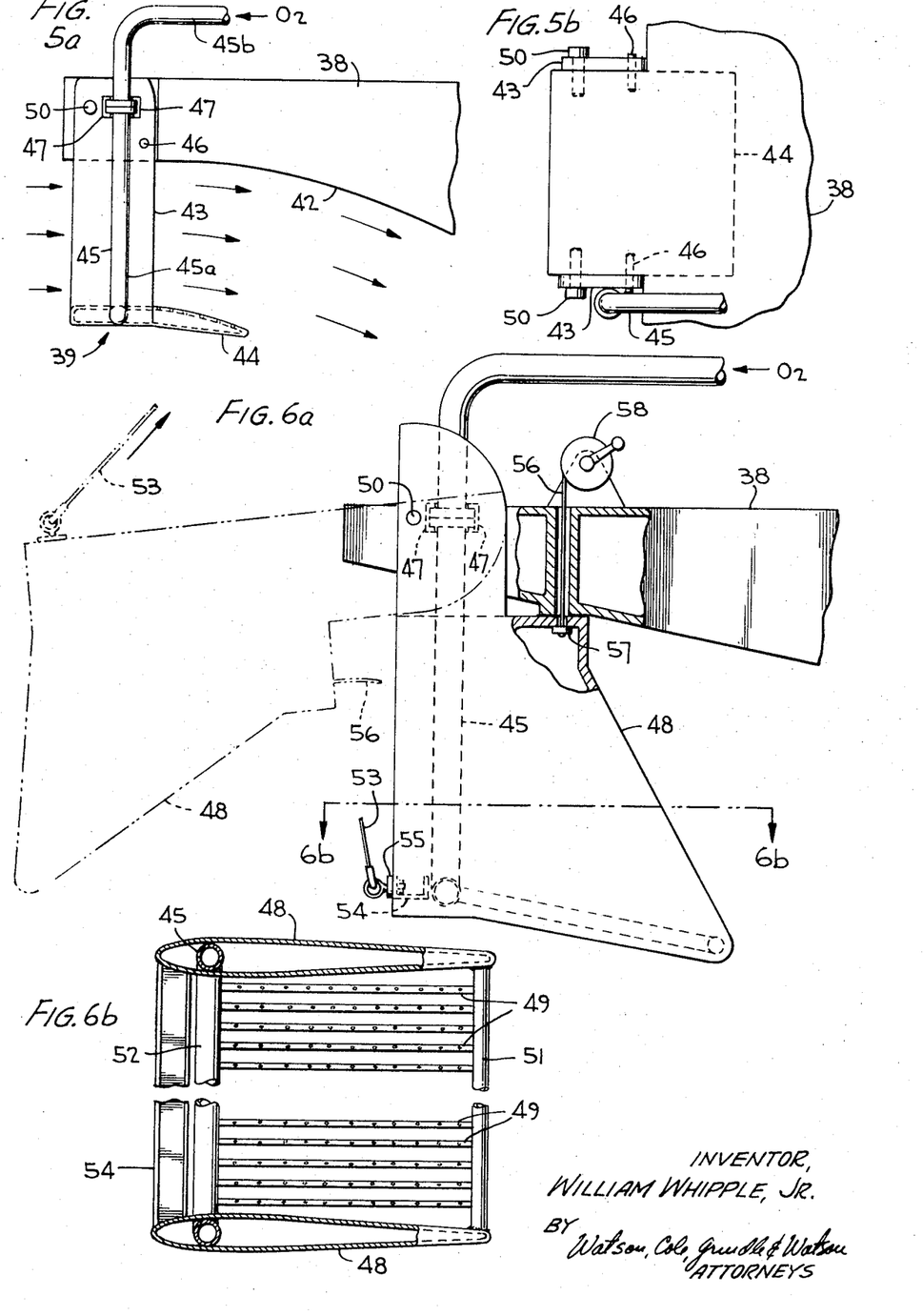

In FIGS. 5a and 5b it can be more clearly seen that the diffuser means 39 comprises a pair of spaced support plates 43, each pivotally secured to the foward end of the barge 38 by means of pivot pins 50, the free ends of each support plate being secured to the opposite sides of a hollow diffuser plate 44 having a series of apertures in its upper surface through which gaseous oxygen may be introduced into the water supplied through a conduit 45 opening into the one side of the hollow diffuser plate. Stop pins 46 are also provided for insertion into suitable apertures provided in each support plate aligned with apertures in the barge structure. In this way, any forward pivotal motion of the diffuser means will be conveniently prevented. When it is desired to raise the diffuser means 39 out of the water for cleaning, for example, pins 46 are removed and clamps 47, used to hold pipe sections 45a and 45b together, are merely removed so as to disconnect the conduit 45 at this joint whereby the diffuser means may be moved in a clockwise direction about pivot points 44 with one simple disconnection of the supply conduit.

The diffuser means 48 embodiment of FIGS. 6a and 6b is similar to that shown in FIGS. 5a and 5b except that a pair of support plates 48, pivotally connected through pins 50 to the forward end of the barge 38, are used for mounting a plurality of elongated diffuser pipes 49 secured at one end to a support pipe 51, shown clearly in FIG. 6b, and at their other end to a header pipe section 52. The latter is integrally secured to oxygen supply conduit 45 so as to direct gaseous oxygen from the oxygen supply into each of the diffuser pipe members 49. The oxygen supply conduit 45 is disposed within one of the hollow supports 48 and its sections 45a and 45b are also capable of being disconnected by simply removing conventional clamps 47 to thereby permit the diffuser assembly to be pivoted clockwise about hinge pins 50 toward its position shown in phantom in FIG. 6a and upwardly therefrom completely out of the water for purposes of cleaning and the like. Such a clockwise movement may be simply effected by means of a cable 53 secured at one end to a support bar 54 which spans the supports 48 and is secured thereto, and at its other end to a convenient winch arrangement (not shown) on board the floating barge.

In order to move the diffuser assembly counterclockwise back into the water about hinge pins 50, a cable 56 is secured at one end, as at 57, to the top of one of the hollow supports 48 and at its other end around a winch drum 58 mounted on board the floating barge 38, as shown in FIG. 6a. In this way, the cable 56 will simply be payed out during movement of the diffuser assembly in its clockwise direction out of the water, whereafter the cable 56 may be wound up onto the winch drum 58 so as to move it in its counterclockwise direction to its position shown in solid lines in FIG. 6a.

It should be noted that since strong turbulence of water in the wake is desired, it will be useful to increase the hydraulic resistance of the barge by designing its stern as rectangular and nonsloping so as to absorb more of the energy created by the propellers of the boat. Also, the propellers will be of such a size as to effect a rapid dispersion of relatively large amounts of oxygen and may therefore tow the single barge faster than is desirable unless such measures to increase hydraulic resistance are provided.

Furthermore, the ballast tank 41 shown in FIGS. 4a and 4b is gravity filled through a conventional valve V and, in the event of a list, a correction may be made by manually changing the settings of the valve. However, the barge is to be built with sufficient freeboard so that it cannot be sunk by filling of the ballast tank even with a full load of oxygen on board.

Figure 7A:
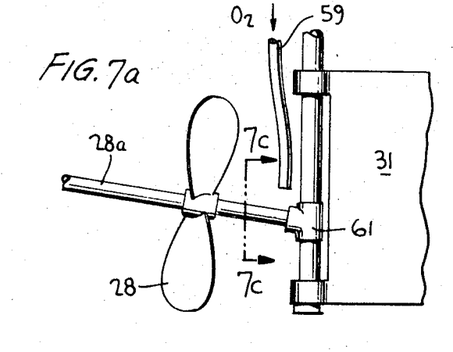
FIG. 7a shows a modification of a means for introducing oxygen into a natural body of water in the vicinity of the oxygen boat propeller.
Figures 7B, 7C:
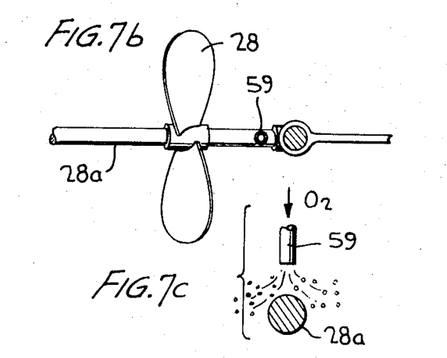
Figure 7D:
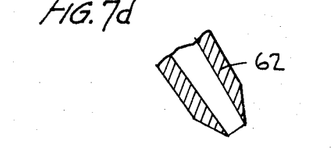

As an alternative to a diffuser of the various types hereinbefore described, an oxygen supply tube 59 shown in FIGS. 7a, 7b, 7c is provided for introducing gaseous oxygen into the natural body of water in the vicinity just aft of propeller 28. Here, the emerging gas which is conveyed at a high velocity but at a relatively low pressure will strike the propeller shaft 28a and will be diverted to the sides of the propeller stream and be thereby dispersed throughout the wake by means of the turbulence created by the high velocity propeller, thereby breaking up the emerging oxygen into fine bubbles. Because of the proximity of the oxygen supply tube 59 to the propeller shaft 28a, it is preferred that a greaseless or sealed bearing 61 be provided to resist chemical action by the oxygen, In the alternative, the oxygen supply tube 59 may also be placed forward of th propeller 28.

Liquid oxygen may also be directed through the oxygen supply tube 59 of FIG. 7a with such tube having an insulated wall and a nozzle tip of the type shown at 62 in FIG. 7a. The liquid oxygen will, of course, vaporize immediately as it is released accompanied with a great absorption of heat. It will therefore be necessary to discharge the liquid oxygen with considerable pressure and velocity so as to avoid accumulation of ice inside the nozzle tip. However, the ice which may form on the nozzle tip will easily melt or break away during movement of the boat through the water. Of course, when liquid oxygen is introduced directly into the water in this way, no atmospheric heat exchanger need be provided. Instead, a pump means is suitable for discharging the liquid oxygen through conduit 59.

Figure 8:
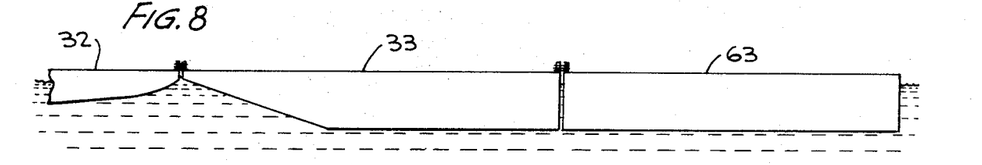
FIG. 8a is a schematic side view of another embodiment according to the present invention showing two interconnected floating barges propelled by means of an oxygen boat.

In FIG. 8a of the drawings, an oxygen recapture barge 63 is shown secured to the floating barge 33 which is in turn secured to the tugboat or vessel 32 of the type similar to that shown in FIGS. 2a and 2b. The various artificial oxygenation equipment and the propellers are not shown in FIG. 8a in the interest of clarity. Such an oxygen recapture barge may be used in conjunction with any of the aforedescribed embodiments for the purpose of recapturing a portion of the gaseous oxygen which would otherwise be lost. The advantage found with the use of such an oxygen recapture barge is that it permits the use of an oxygen diffuser or dispensing device of lesser transfer efficiency and greater capacity as compared to the fine-bubble diffusers which might otherwise be required. When using such a recapture barge, the forward end thereof and the aft end of the adjacent floating barge 33 may be rectangularly designed and butted together so as to assure an uninterrupted flow of water of the oxygenated wake passing thereby.

Figure 9A:
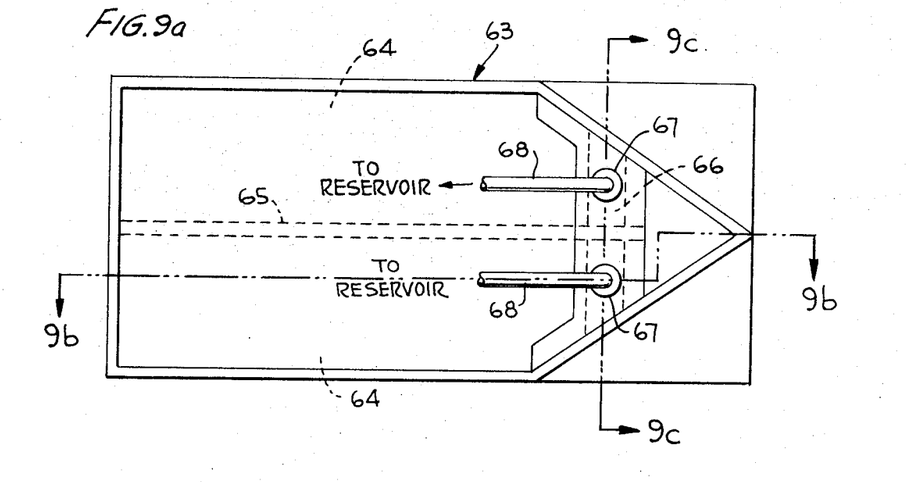
FIG. 9a is a top view of the aft barge shown in FIG. 8b.
Figure 9B:
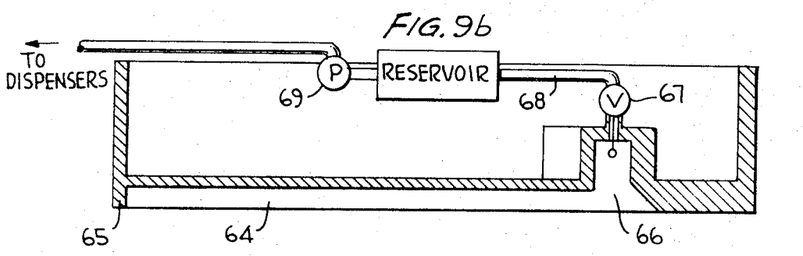
Figure 9C:
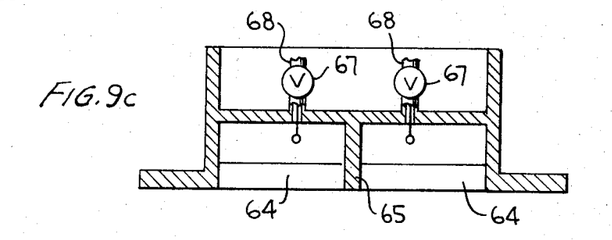

FIG. 9a is a top plan view of the oxygen recapture barge 63, and FIGS. 9b and 9c show more of the specific details thereof. The bottom of barge 63 may be shaped into two recesses 64, being divided by means of a partition 65 so as to increase stability of the barge and to reduce weight action which might otherwise create instability. Each recess 64 has a deeper portion or reservoir 66 in which bubbles will be accumulated, and from the top of each reservoir 66 float control valve 67 is provided leading to a tube 68 and thence to a reservoir, controls (not shown), and an oxygen pump 69, which together will act so as to maintain the pressure in the manifold at an advantageous level and so as to recirculate the oxygen which has been salvaged from each of the recesses 64 back into the primary oxygen dispersing devices located on either the barge 33 or the boat 32 as the case may be.

In still another embodiment according to the present invention, the water to be purified is pumped on board the boat or barge, oxygenated there, and discharged back into the natural body of water so as to be dispersed either directly by the propeller itself, its propeller wake, or by the natural turbulence of the water body. The oxygenation of water on board may be carried out in a tank by means of an oxygen diffuser, with an example thereof being shown in FIGS. 10a and 10b wherein a floating barge 71 is propelled by means of vessel 32 of a type similar to that described for the several previous embodiments. Here, liquid oxygen is stored in an oxygen supply tank 72 and volatilized as usual with the aid of a heat exchanger such as 73, then piped through conduits 74, 75 to diffuser pipes 76 located in tank 77 near its bottom. The water to be purified is pumped into the top of the tank after it has been sucked on board by means of suction pump 78 through pipe 80. Suction is controlled by a regulator valve 79 so as to regulate the desired amount of flow through piping 81. The water introduced into tank 77 is thereby oxygenated as it flows downwardly against the rising oxygen bubbles and is discharged through a pipe 82 which may be throttled with a suitable means for regulating the amount of discharge. The discharge or outlet pipe 82 discharges the highly oxygenated water forward of the propellers 28 so as to be dispersed thereby and by the turbulence of the wake created. Alternately, the discharge tube may discharge the highly oxygenated water into undisturbed water at the side of the vessel 32 so as to thereafter be dispersed by the propellers.

Figure 10A:
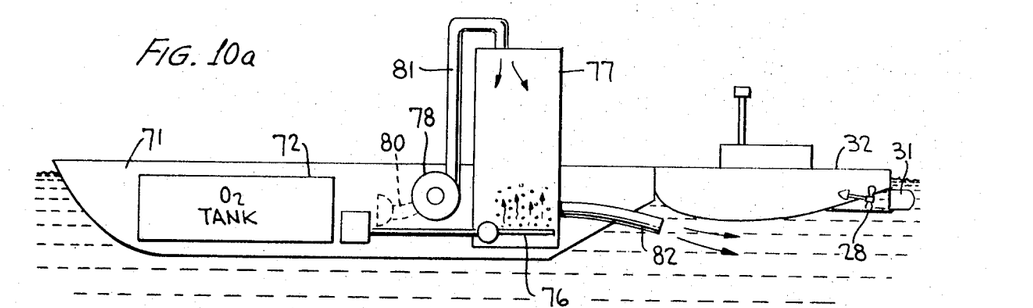
FIG. 10a is a schematic view of a floating barge propelled by means of an oxygen boat in accordance with another aspect of the present invention wherein the water is oxygenated on board the floating barge before it is discharged into the natural body of water.
Figure 10B:
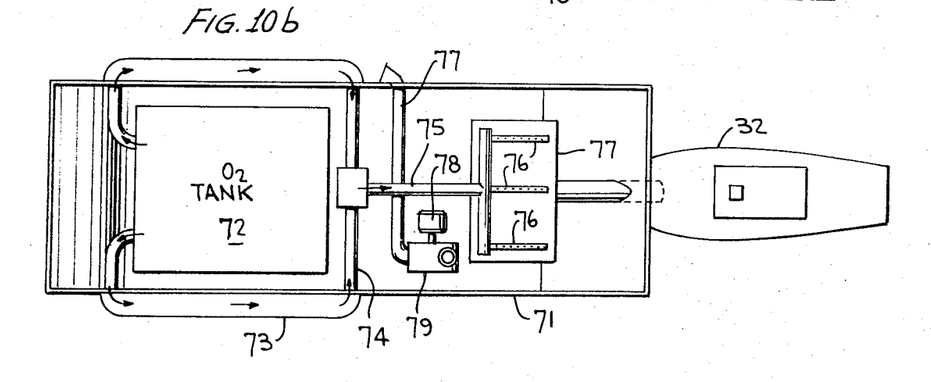
Figure 11A:
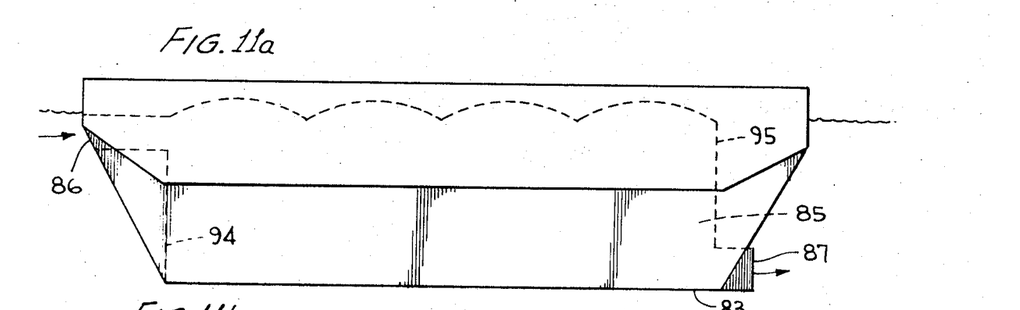
FIGS. 11a and 11b are, respectively, side and top schematic views of a floating barge propelled by means of an oxygen boat (not shown) in accordance with another aspect of the present invention.
Figure 11B:
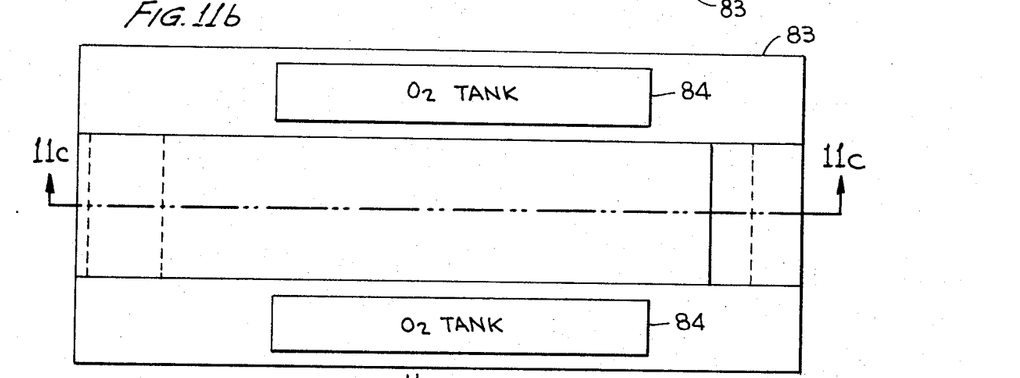

FIGS. 11a and 11b are side and top plan views, respectively, of a floating barge 83 similar to that shown in FIGS. 10a, 10b except that the oxygen supply tanks 84 are arranged in a slightly different location thereon and the heat exchanger with the various tubings and pumps are not shown in the interest of clarity. The tank 85 in which the water is oxygenated is mounted within the barge 83 and has an inlet 86 and an outlet 87 between which the water to be purified passes within the tank in a manner to insure sufficient absorption of the gaseous oxygen before being discharged into the vicinity of the propeller of the adjacent vessel. The tank is divided into four compartments 85a, 85b, 85c, 85d, by means of transverse partitions 88 extending between the bottom wall 89 of the tank and its top wall 91 as clearly seen in FIG. 11c. Each of these partitions is provided with a cut-out section 92, as shown in FIG. 11e, at opposite sides thereof a distance from the top and bottom sides of each partition. Longitudinal partition walls 93 equal to the height of each cut-out section extend between transverse partitions 88 in compartments 85b, 85c and extend between the front wall 94 and partition 88 in compartment 85a and between partition 88 and rear wall 95 in partition 85b. Also, inclined walls 96 extend in a manner similarly described for each longitudinal partition wall 93 except that they are inclined upwardly in a rearward direction as shown clearly in FIG. 11c so that each inclined partition wall 96 in compartment 85a extends between forward tank wall 94 near the lower edge of each partition 93 and to the top of cut-out 92 in the adjacent partition wall 88, and likewise for the remaining compartments. Oxygen-dispensing devices 97a, 97b, 97c, 97d are located on the bottom wall 89 of the tank in each respective compartment so that gaseous oxygen may be supplied to each one from oxygen supply tanks 84 through respective oxygen supply conduits 98a–98d, shown only partially in FIGS. 11c and 11d in the interest of clarity.

Figures 11C, 11D:
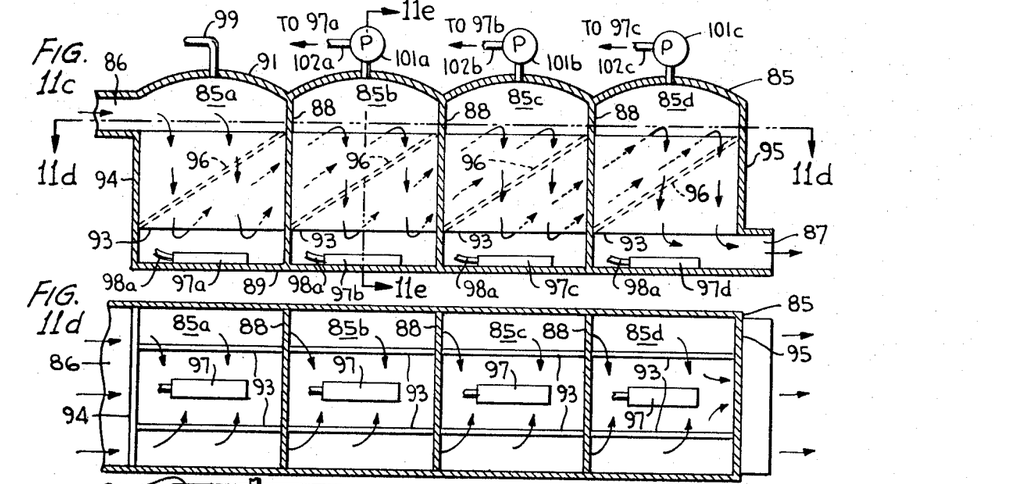
FIG. 11c is a longitudinal sectional view taken along the line 11c—11c of FIG. 11b.
FIG. 11d is a sectional view taken along the line 11d—11d of FIG. 11c.
Figure 11E:
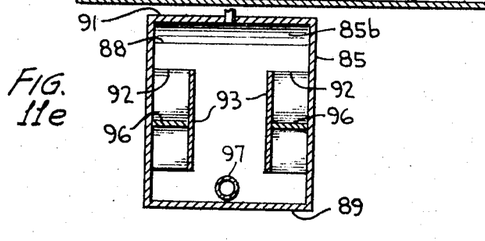
FIG. 11e is a transverse sectional view of the floating barge taken along the line 11e—11e of FIG. 11d.

The water to be purified enters the tank 85 through inlet 86 at the top of compartment 85a, flows downwardly therein between longitudinal partitions 93 and ultimately to the outside of partitions 93 beneath inclined walls 96 and into the adjacent compartment 85b to the top thereof, shown by the arrows in FIG. 11c, downwardly through this compartment between walls 93, outwardly thereof and beneath partitions 96 in compartment 85b and into adjacent compartment 85c to the top portion thereof in a manner similar to that described for compartment 85b. The water then is ultimately discharged through outlet 87 after it flows in a like manner through compartments 85c and 85d.

As the water passes downwardly in compartment 85a after it enters through inlet 86, the oxygen bubbles from oxygen-dispersing device 87a rise therethrough so that after absorption of the oxygen any residual gas is wasted to the atmosphere at the top of compartment 85a through tubing 99. As the water continues in its movement to the top of compartment 85b any residual oxygen therein which has not been absorbed is collected and pumped by means of a pump 101a back into the oxygen-dispensing device 97a through conduit 102a shown only partially in the interest of clarity. The water then descends in the chamber 85b against the rising oxygen bubbles from dispensing device 97b with any residual gas during such descent being collected and pumped in a like manner by means of pump 101a to the oxygen-dispensing device 97a after which the water continues its flow into the top of compartment 85c so that any residual gas therein is collected and pumped by means of pump 101b to the oxygen-dispensing device 97b through conduit 102b and likewise for the pump 101c which collects and pumps any residual oxygen through conduit 102c into oxygen-dispensing device 97c after the water reaches the top of compartment 85b. After the water descends in the last compartment 85d it is ultimately discharged through outlet 87 into the natural body of water where it is dispersed by the moving propellers in a manner similar to that described for FIGS. 10a and 10b.

It should be noted that an extension for outlet 87 may be provided to discharge the highly oxygenated water more directly to the propellers in order to assure prompt dispersion. Also, it may be desirable to obtain greater velocity in the water circulating through the water passages in the various compartments so that some supplementary means of circulation such as propellers in the inlet and outlet may be suitably provided. Further, the multiple-compartmented tank provides a highly efficient manner in dissolving the oxygen in that little of it is wasted due to the pumps which collect and pump the residual oxygen back into one of the oxygen-dispensing devices as described. It is therefore not necessary to use either additional pressure in the compartments or to make use of extremely fine bubble diffusers, which would otherwise be needed for high efficiency.

Figure 12A:
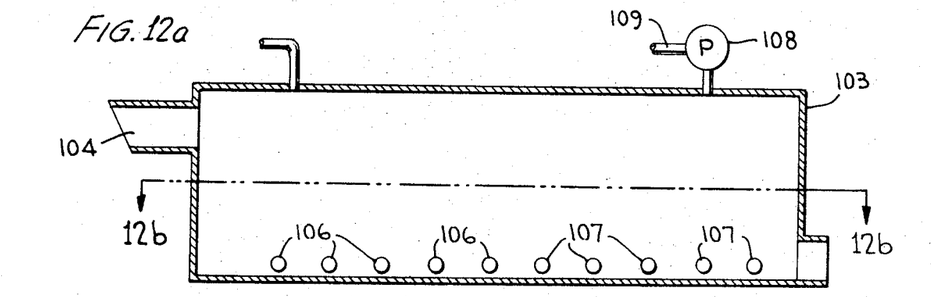
FIG. 12a is a longitudinal sectional view of a floating barge suitably propelled by a boat (not shown) in accordance with another aspect of the present invention.
Figure 12B:
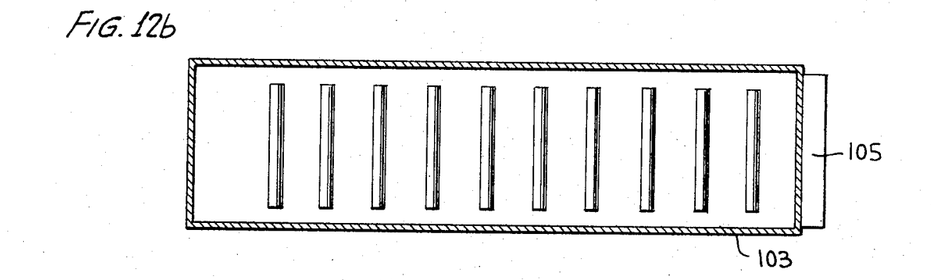
FIG. 12b is a longitudinal sectional view of the floating barge of FIG. 12a taken along the line 12b—12b thereof.

In FIGS. 12a and 12b another embodiment of a tank to be used for on-board oxygenation is shown, it being understood that such tank may be used in lieu of tank 77 shown in FIGS. 10a and 10b and that the other oxygenating paraphernalia shown therein is omitted in this embodiment in the interest of clarity. The tank 103 comprises a single chamber having an inlet 104 and an outlet 105 with two groups of oxygen diffusers 106 and 107 being provided. Diffusers 107 are fed through suitable conduits (not shown) from the oxygen supply tanks so that as water flows between inlet and outlet, it is oxygenated as the bubbles rise upwardly therethrough and the oxygen not so dissolved is drawn off by one or more pumps 108 and recycled to the other group of diffusers 106 through conduit 109 in any conventional manner (not shown). If necessary, a third group of such diffusers may be provided with another pump in the vicinity of the group or diffusers 106 for directing any residual oxygen into the third group of diffusers similar to the manner as aforedescribed for the second group.

Figure 13A:
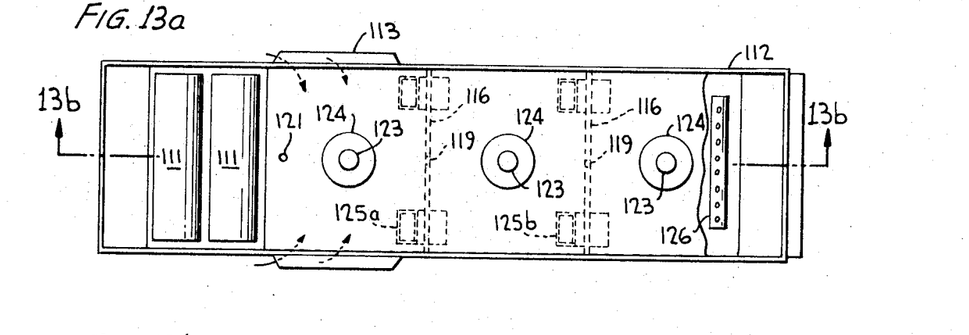
FIG. 13a is a top view of still another embodiment of the present invention showing a floating barge propelled by a boat (not shown), the barge having mechanical aerators in addition to a diffuser for the purpose of oxygenating the water flowing therethrough.
Figure 13B:
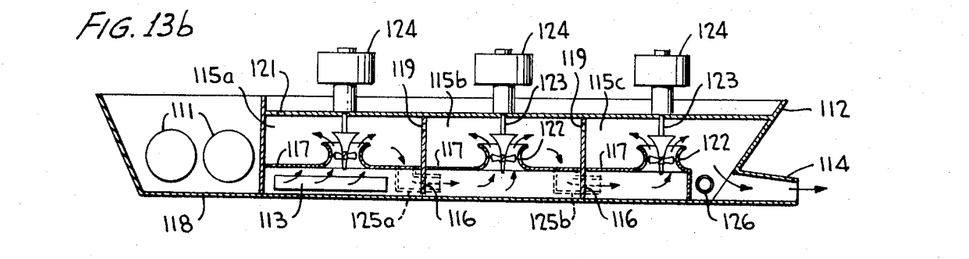

The embodiment shown in FIGS. 13a and 13b sets forth still another manner of oxygenating the water on board the floating barge. Here, oxygen supply tanks 111 are shown although the remaining oxygen paraphernalia is omitted for the sake of clarity. Barge 112 has an inlet 113 and an outlet 114 and is divided into chambers 115a, 115b and 115c by means of transverse partition walls 116, each of such chambers being divided into an upper and lower section by means of a horizontal partition wall 117 in spaced parallel relationship with respect to the bottom wall 118 of the barge. Orifices 119 connect chambers 115a, 115b and chambers 115b, 115c while chamber 115a is vented through an aperture 121. Each orifice may also have a valve (not shown) for adjusting the pressure to the desired operating conditions.

After the water to be purified enters the lower section of chamber 115a through inlet 113, it is drawn into its upper section through an opening partition wall 117 which is surrounded by an inlet cone 122. The means used for drawing the water in such a manner into the upper section comprises a mechanical aerator 123 of any conventional type powered by a motor means 124. The water drawn upwardly into the upper chamber in compartment 115a is therefore oxygenated with the oxygen and residual gases in the chamber and then flows into chamber 115b through passage 125 so that it will enter the lower section in 115b and be drawn upwardly into its upper section by the mechanical aerator therein and thereafter flow into chamber 115c through passage 125b in a manner similar to that described above. A diffuser pipe 126 is provided in chamber 115c and is suitably connected by a conduit (not shown) to the supply tanks 111 so as to introduce gaseous oxygen into the chamber 115c thereby oxygenating the already oxygenated water in the chamber before it is discharged through outlet 114 into the natural body of water and dispersed by the propellers in a manner as described earlier. The pressure in chamber 115c will be somewhat higher because of the accumulative action of the three aerator pumps. However, any pressure above atmospheric will be converted into kinetic energy and the velocity of the water being discharged through outlet 114 will therefore aid in discharging the oxygen-supersaturated water rapidly, and it may also aid in propelling of the barge 112.

Figure 14A:
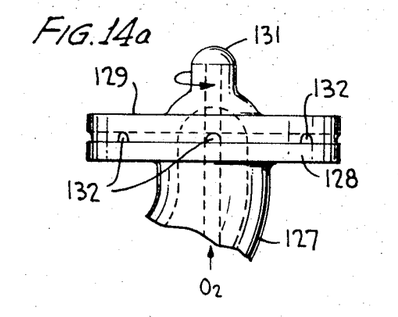
FIG. 14a is a partial side view and elevation of an auto-disperser element usable for the purpose of introducing gaseous oxygen into the natural body of water.
Figure 14B:
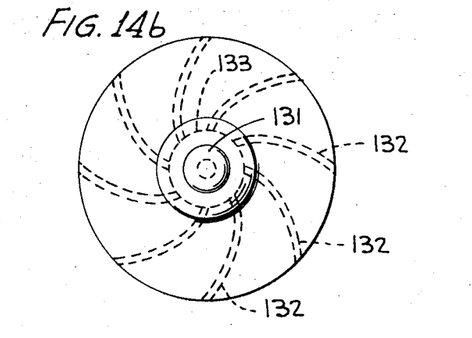

In FIGS. 14a and 14b an autodisperser is shown for the purpose of introducing the gaseous oxygen into the natural body of water and may be used in place of any of the above-described diffusers. Here, the device comprises a fixed conduit 127 having a circular flange 128 at one end thereof and having a movable circular cap portion 129 rotatably secured thereto as at 131. The movable cap is provided with a plurality of radially disposed grooves 132 along its surface which faces flange 128. From FIG. 14b it can be clearly seen that each of these grooves 132 is slightly bent in a common direction so that as the gaseous oxygen enters the circular central groove 133 with which each of the grooves 132 communicates the cap portion 129 will be rotated in a direction opposite to that of the bent direction of the grooves 132 while gaseous oxygen is being introduced into the water. The release points at the ends of each groove 132 will therefore move rapidly throughout the water so as to prevent the emitted gas from accumulating in large bubbles. Also, the cap 129 may have attached lugs, fins or paddles thereon for the purpose of increasing the turbulence created by rotation.

Figure 15A:
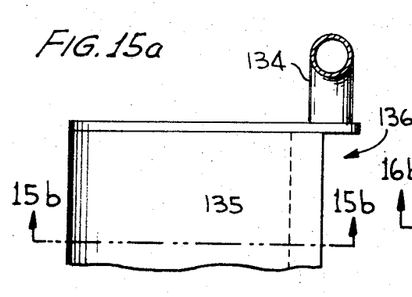
FIG. 15a is a plan view showing a portion of an aspirator device used for introducing oxygen into a natural body of water.
Figure 15B:
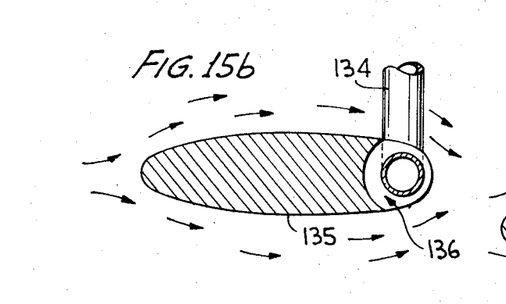

As another alternative to any of the oxygen-introducing means heretofore described, one embodiment of the means for dispersing oxygen widely throughout a body of water moving rapidly relative to the oxygen-emitting conduit is shown in FIGS. 15a and 15b wherein a conduit 134 for introducing gaseous oxygen into the natural body of water is secured at its open end to one side of a solid blade member 135 which is horizontally disposed in the water. The upper and lower surfaces of the member 135 are contoured in the manner shown so as to effect a smooth hydraulic flow of the water with respect to the blade member as shown by the arrows in FIG. 15b. The gaseous oxygen is discharged through conduit 134 into a space 136 at the aft end of the blade member and, aided by the negative pressure created as the water flows along the blade surfaces, will fill the space 136 throughout substantially the entire blade width. This oxygen will be drawn into the water along a considerable width of the device, depending upon its geometry and the velocities of both the water flowing along the blade member and of the oxygen emitted from the conduit.

Figure 16A:
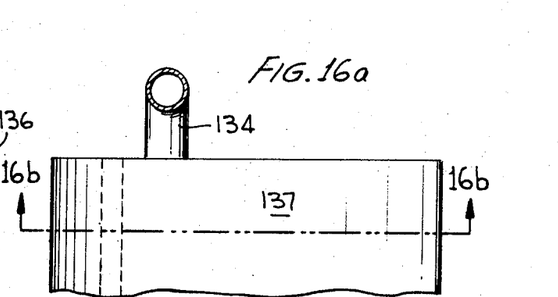
FIG. 16a is a plan view showing a portion of another aspirator similar to that of FIG. 16a in accordance with the present invention.
Figure 16B:
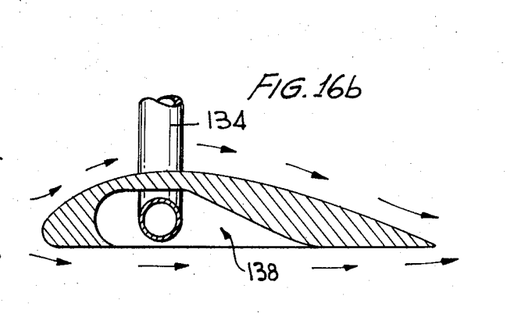

Another embodiment of this type of oxygen-dispersing means is shown in FIGS. 16a and 16b wherein conduit 134 is open-ended into a hollow space 138 of a blade member 137 which is disposed substantially horizontally in the water. The top surface of the member 137 is contoured so as to cause the water to flow therearound in the manner shown by the arrows in FIG. 18b thereby creating a negative pressure in the space 138 so as to aid in drawing the gaseous oxygen substantially within the entire width of the member 137. In both embodiments the oxygen introduced into the water in this manner will be dispersed by means of the propellers and the turbulent flow in its wake. With such oxygen-dispersing means, there is much less chance of clogging as the oxygen is emitted into the water as compared to a device using a plurality of small holes through which the oxygen is emitted. Also, this type of device is extremely simple and when operated in conjunction with a propeller, will disperse larger quantities of oxygen throughout a larger water mass.

Figure 17:
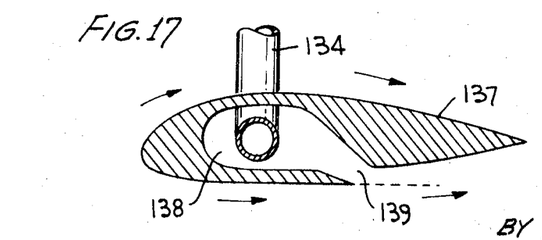
FIG. 17 is a sectional view similar to FIG. 16b except that still another aspirator is shown in accordance with the present invention.

In FIG. 17 still another embodiment of an aspirator is shown in cross-section which is streamlined except for a slot 139 through which the gaseous oxygen is emitted. As before, the gaseous oxygen is drawn into the surrounding water as a negative pressure is created at the bottom of slot 139 during movement of the water along the sides of blade member 137. Slit 139 is sufficiently small so as not to admit water into space 138 but is, of course, large enough so as not to permit an appreciable pressure build-up in space 138.

From the foregoing it can be seen that this invention provides for an efficient technique for oxygenating a natural body of water with pure oxygen in such a manner that the oxygen is dispersed throughout a large mass of water by means of a moving waterborne vessel thereby insuring artificial oxygenation for a larger span of water than heretofore possible. Since the oxygen-supersaturated water is effectively dispersed throughout and mixed with the surrounding untreated water, any danger to fish of excessively oxygenated water is substantially minimized in a manner which is not only highly efficient but economical to produce and simple in its operation. The oxygen supply tanks and the other oxygenating paraphernalia are simply carried on board either a moving vessel or a moving barge so that the obvious time and expense needed for construction of permanent oxygenation sites is avoided.

If desired, the pure oxygen could be generated on board either the boat or the barge in any known manner so as to greatly reduce the requirements for a heat exchanger and the need for cryogenic storage tanks while at the same time avoiding any requirement for transporting liquid oxygen from a supply station to the vessel.

Obviously many modifications and variations of the present invention are possible in the light of the above teachings. It is therefore to be understood that within the scope of the appended claims the invention may be practiced otherwise than as specifically described.

What is claimed is:

1. Process of purifying the pollutants in a natural body of water by means of a mobile floating apparatus having a rotatable propeller for propelling the apparatus, comprising the steps of dissolving oxygen into the water in such quantity whereby the water becomes supersaturated with oxygen, and agitating the supersaturated water with the wake of said propeller so as to cause the supersaturated water to be dispersed throughout and mixed with the surrounding mass of untreated water to thereby oxidate the pollutants in the water.

2. Process, according to claim 1, including the further step of collecting any excess amount of oxygen which may not have been dissolved with the water and thereafter directing the collected excess amount of oxygen back into the wake of the propeller.

3. Process, according to claim 1, including the step of first introducing a quantity of water to be purified into a tank wherein the oxygen is dissolved into said predetermined quantity of water and including the further step of introducing the supersaturated water from said container into the body of natural water whereafter it is agitated so as to be dispersed throughout and mixed with the untreated mass of water.

4. Process, according to claim 3, wherein said dissolving step includes the step of diffusing the oxygen into the predetermined quantity of water a location near the bottom of said tank.

5. Process, according to claim 4, wherein said tank has a plurality of intercommunicating compartments, each with a diffuser located therein, and including the further step of aerating the oxygen-supersaturated water in each of said compartments before being allowed to flow into an adjacent compartment.

6. Process, according to claim 4, including the further step of collecting any excess amount of oxygen which may not have been dissolved with the water in said tank and thereafter directing the collected excess amount of oxygen back to said location.

7. Process, according to claim 6, wherein said tank has a plurality of intercommunicating compartments, each with a diffuser located therein whereby the water introduced thereinto is supersaturated with oxygen in the first one of said compartments, flows into the second one of said compartments, excess oxygen being collected therein and directed to the diffuser in said first compartment, and so on with respect to adjacent ones of said compartments.

8. Apparatus for purifying the pollutants in a body of water comprising a container for the supply of liquid oxygen to its gaseous state both located on board a waterborne vessel propelled by means of at least one screw propeller; support means on the hull of said vessel for locating said propeller below the bottom of said hull, means located in the vicinity of said propeller for introducing gaseous oxygen directly into the water to be purified, and means for directing gaseous oxygen from said supply to said gaseous oxygen introduction means, said propeller being rotatable about an axis which is inclined sightly downward from the horizontal and said support means being elongated so as to position said propeller a predetermined depth into the body of water whereby the water, which is directly supersaturated with oxygen by said gaseous oxygen introduction means, may be effectively mixed with the surrounding mass of water not directly supersaturated as the water is agitated at a sufficient depth by means of said propeller.

9. Apparatus, according to claim 8, wherein said means for introducing gaseous oxygen directly into the water comprises a diffuser means.

10. Apparatus, according to claim 9, wherein a pair of said propellers is provided, said diffuser means comprising an elongated diffuser pipe associated with each said propeller.

11. Apparatus, according to claim 9, wherein said diffuser means comprises a double-walled annular structure surrounding said propeller, the axis of said annular structure being coincident with said propeller axis and the inner wall of said diffuser having apertures therein whereby the gaseous oxygen may be introduced into the water therethrough and into the stream of turbulent water passing said propeller.

12. Apparatus, according to claim 8, wherein said means for introducing gaseous oxygen directly into the water to be purified comprises a disperser means in the form of a tube having its open end located in the vicinity of said propeller.

13. Apparatus, according to claim 8, wherein a floatable barge means is also provided and is propelled by means of said propeller, means on said barge means for capturing part of the excess gaseous oxygen which may not have been dissolved in the water, said capturing means comprising a recess formed by partition walls on the exterior of the bottom wall of said barge means for directing any excess gaseous oxygen collected in said recess back into said gaseous oxygen-introducing means.

14. Apparatus, according to claim 8, wherein said gaseous oxygen introduction means comprises an autodisperser having a conduit section for directing gaseous oxygen toward one end thereof, and a cap section rotatably mounted at said one end, said cap section having a plurality of radially disposed grooves along one surface thereof facing said one end, whereby the gaseous oxygen is emitted through said grooves in a fine gaseous spray.

15. Apparatus, according to claim 14, wherein said grooves are each bent toward a common direction so as to cause rotation of said cap in a direction opposite said common direction.

16. Apparatus, according to claim 8, wherein said gaseous oxygen-introducing means comprises a horizontal blade member and a hollow tube having an open end secured to one side of said blade member at said open end, said blade member having streamlined flow surfaces and a hollow section at which said pipe open end is secured whereby gaseous oxygen, introduced into the hollow section by pressure, is aided in passing into the water by the negative pressure created therein during the water flow along said blade member surface.

17. Apparatus, according to claim 16, wherein said hollow section is located at the aft end of said blade member.

18. Apparatus, according to claim 16, wherein said hollow section is located between the fore and aft ends of said blade member and opens downwardly.

19. Apparatus for purifying the pollutants in a natural body of water comprising a container for a supply of liquid oxygen and means for converting the liquid oxygen to its gaseous state both located on board a floatable barge means propelled by means of a propeller mounted on the hull of a waterborne vessel, means mounted at the forward end of said barge means introducing gaseous oxygen directly into the water to be purified, and conduit means for directing gaseous oxygen from said supply to said gaseous oxygen introducing means, said barge means forward end being inclined downwardly away from the horizontal whereby the gaseous oxygen may be introduced into the propeller wake and be directed downwardly into the water by mean of said inclined forward end.

20. Apparatus, according to claim 19, wherein said gaseous oxygen-introducing means comprises a wide diffuser plate and an elongated connector for mounting said plate below the depth of said propeller.

21. Apparatus, according to claim 19, wherein said gaseous oxygen-introducing means comprises a plurality of elongated diffuser pipes disposed parallel to the longitudinal axis of said barge, manifold and support pipes mounted at opposite ends of said pipes, said conduit means communicating with said manifold means, and supporting plates secured to the opposite ends of said manifold and support pipes for mounting them to said barge.

22. Apparatus, according to claim 19, wherein said gaseous oxygen-introducing means is pivotally mounted at the forward end of said barge whereby it may be moved out of the water in a direction away from said barge forward end.

23. Apparatus, according to claim 22, wherein a cable is provided and secured at one end to said gaseous oxygen-introducing means, the other end of said cable being wound around a winch means located on said barge, whereby said gaseous oxygen-introducing means may be moved in a direction toward said barge forward end upon the winding of said winch after it is so moved out of the water.

24. Apparatus, according to claim 19, wherein said means for introducing gaseous oxygen directly into the water to be purified comprises a disperser means in the form of a tube having its open end located in the vicinity of said propeller.

25. Apparatus, according to claim 19, wherein said barge means is provided with means thereon for capturing part of the excess gaseous oxygen which may not have been dissolved in the water, said capturing means comprising a recess formed by partition walls on the exterior of the bottom wall of said barge means for directing any of said excess gaseous oxygen collected in said recess back into said gaseous oxygen-introducing means.

26. Apparatus for purifying the pollutants in a natural body of water comprising a container for a supply of liquid oxygen located on board a waterborne vessel propelled by means of a rotatable screw propeller, support means on the hull of said vessel for locating said propeller at a distance below the bottom of said hull, disperser means in the form of a tube having its open end located in the vicinity of said propeller for introducing liquid oxygen directly into the wake of said rotatable propeller which liquid oxygen will vaporize as it is released under a high pressure and velocity.

27. Apparatus for purifying the pollutants in a natural body of water comprising a container for a supply of liquid oxygen and means for converting the liquid oxygen to its gaseous state both located on board a waterborne vessel propelled by means of a screw propeller mounted thereon, a water suction tube and a suction pipe on said vessel for introducing water from the natural body of water into a tank on board the vessel from the top bottom thereof, conduit means interconnecting said supply with said diffuser means, the water within said tank being supersaturated with oxygen by said diffuser means and being discharged into the natural water body through a discharge pipe connected therewith, said oxygen-supersaturated water being dispersed throughout the body of water by means of the turbulence created by said movable propeller.

28. Apparatus, according to claim 27, wherein said tank is separated by transverse partition walls into a plurality of interconnected horizontally related compartments, said diffuser means comprising diffusers located near the bottom of each said compartment, the first one of said compartments having a water inlet and the last one of said compartments having an outlet, each of said compartments other than said first one having a pump connected therewith, and each of said compartments having means for directing water to flow upwardly from each of said compartments, into the tops of each adjacent compartment, and downwardly therethrough between said inlet and said outlet whereby the water is oxygenated in sequence by means of each of said diffusers, and said pumps serving to direct any excess oxygen from said compartments to the diffuser of an adjacent compartment to thereby insure that the water in said last compartment is more fully oxygenated than any of the remaining compartments.

29. Apparatus, according to claim 28, wherein said directing means comprises longitudinal partition walls extending between opposing forward and aft walls in each said compartment and at a distance from the tops and bottoms of each said compartment, and walls being provided inclined upwardly toward the tops of each adjacent compartment extending between each said longitudinal partition and the side walls of each said compartment, said transverse partition walls extending between each said compartment top and said compartment bottom and extending between said longitudinal partition walls in each compartment whereby the water may be made to flow downwardly in each said compartment between said longitudinal partition walls and upwardly along said inclined walls to the top of an adjacent compartment.

30. Apparatus, according to claim 27, wherein said diffuser means comprises a plurality of diffuser pipes, several of which are connected to said supply by said interconnecting means, and a pump means being provided in the vicinity of said several diffusers for directing any excess oxygen to the remainder of said diffuser pipes.

31. Apparatus, according to claim 27, wherein said tank is separated by transverse partition walls into a plurality of interconnected horizontally-related compartments, the first one of said compartments having a water inlet and the last one thereof having a water outlet, said diffuser means being located within said last compartment, and each said compartments having a mechanical aerator associated therewith so as to aerate the water in each said compartment as it flows from inlet to outlet.

32. Apparatus, according to claim 31, wherein partition walls are provided in each said compartment spaced from and parallel to the bottoms thereof thereby forming upper and lower sections, an aerator cone provided on each said parallel partition wall located beneath said aerator, and passage means provided between compartments permitting water to flow between inlet and outlet whereby the water flow through said tank is confined to each of said lower compartment sections and is partially drawn up into said upper compartment sections upon rotation of said aerators to thereby aerate the water in each said compartment.

* * * * *